US010162242B2

(12) United States Patent
Wang et al.

(10) Patent No.: US 10,162,242 B2
(45) Date of Patent: Dec. 25, 2018

(54) COLOR DISPLAY DEVICE

(71) Applicant: E Ink California, LLC, Fremont, CA (US)

(72) Inventors: Ming Wang, Fremont, CA (US); Hui Du, Milpitas, CA (US); HongMei Zang, Fremont, CA (US); Peter Laxton, Alameda, CA (US)

(73) Assignee: E INK CALIFORNIA, LLC, Fremont, CA (US)

(*) Notice: Subject to any disclaimer, the term of this patent is extended or adjusted under 35 U.S.C. 154(b) by 61 days.

(21) Appl. No.: 14/505,441

(22) Filed: Oct. 2, 2014

(65) Prior Publication Data

US 2015/0103394 A1   Apr. 16, 2015

Related U.S. Application Data

(60) Provisional application No. 61/890,106, filed on Oct. 11, 2013.

(51) Int. Cl.
*G02F 1/167* (2006.01)

(52) U.S. Cl.
CPC ...... *G02F 1/167* (2013.01); *G02F 2001/1678* (2013.01); *G02F 2202/022* (2013.01); *G02F 2202/04* (2013.01); *G02F 2202/36* (2013.01)

(58) Field of Classification Search
None
See application file for complete search history.

(56) References Cited

U.S. PATENT DOCUMENTS

| | | |
|---|---|---|
| 3,756,693 A | 9/1973 | Ota |
| 3,892,568 A | 7/1975 | Ota |
| 4,298,448 A | 11/1981 | Muller et al. |
| 5,378,574 A | 1/1995 | Winnik et al. |
| 5,980,719 A | 11/1999 | Cherukuri et al. |
| 6,198,809 B1 | 3/2001 | Disanto et al. |
| 6,337,761 B1 | 1/2002 | Rogers et al. |
| 6,373,461 B1 | 4/2002 | Hasegawa et al. |
| 6,486,866 B1 | 11/2002 | Kuwahara et al. |
| 6,517,618 B2 | 2/2003 | Foucher et al. |
| 6,525,866 B1 | 2/2003 | Lin et al. |
| 6,538,801 B2 | 3/2003 | Jacobson et al. |
| 6,600,534 B1 | 7/2003 | Tanaka et al. |

(Continued)

FOREIGN PATENT DOCUMENTS

| | | |
|---|---|---|
| CN | 1705907 A | 12/2005 |
| CN | 1828398 A | 9/2006 |

(Continued)

OTHER PUBLICATIONS

U.S. Appl. No. 14/794,689, filed Jul. 8, 2015, Chan et al.

(Continued)

*Primary Examiner* — Ricky Mack
*Assistant Examiner* — Gary O'Neill
(74) *Attorney, Agent, or Firm* — Antranig Baronian (57) ABSTRACT

The present invention provides a solution for a highlight or multicolor display device, in which each display cell can display high quality color states. More specifically, an electrophoretic fluid is provided which comprises three types of charged particles and a fourth type of particles which is substantially uncharged neutral buoyancy particles, all of which are dispersed in a solvent or solvent mixture.

13 Claims, 2 Drawing Sheets

(56) References Cited

U.S. PATENT DOCUMENTS

| | | |
|---|---|---|
| 6,650,462 B2 | 11/2003 | Katase |
| 6,680,726 B2 | 1/2004 | Gordon, II et al. |
| 6,693,620 B1 | 2/2004 | Herb et al. |
| 6,693,621 B1 | 2/2004 | Hayakawa et al. |
| 6,704,133 B2 | 3/2004 | Gates et al. |
| 6,724,521 B2 | 4/2004 | Nakao et al. |
| 6,729,718 B2 | 5/2004 | Goto et al. |
| 6,751,007 B2 | 6/2004 | Liang et al. |
| 6,751,008 B2 | 6/2004 | Liang et al. |
| 6,781,745 B2 | 8/2004 | Chung et al. |
| 6,829,078 B2 | 12/2004 | Liang et al. |
| 6,864,875 B2 | 3/2005 | Drzaic et al. |
| 6,876,486 B2 | 4/2005 | Hiraoka et al. |
| 6,930,818 B1 | 8/2005 | Liang et al. |
| 6,947,203 B2 | 9/2005 | Kanbe |
| 6,967,762 B2 | 11/2005 | Machida et al. |
| 6,987,503 B2 | 1/2006 | Inoue |
| 6,987,603 B2 | 1/2006 | Paolini, Jr. et al. |
| 6,987,605 B2 | 1/2006 | Liang et al. |
| 7,009,756 B2 | 3/2006 | Kishi et al. |
| 7,019,889 B2 | 3/2006 | Katase |
| 7,034,987 B2 | 4/2006 | Schlangen |
| 7,038,655 B2 | 5/2006 | Herb et al. |
| 7,038,670 B2 | 5/2006 | Liang et al. |
| 7,046,228 B2 | 5/2006 | Liang et al. |
| 7,050,218 B2 | 5/2006 | Kanbe |
| 7,057,600 B2 | 6/2006 | Goden |
| 7,057,798 B2 | 6/2006 | Ukigaya |
| 7,075,502 B1 | 7/2006 | Drzaic et al. |
| 7,116,466 B2 | 10/2006 | Whitesides et al. |
| 7,116,467 B2 | 10/2006 | Kornbrekke et al. |
| 7,226,550 B2 | 6/2007 | Hou et al. |
| 7,259,744 B2 | 8/2007 | Arango et al. |
| 7,271,947 B2 | 9/2007 | Liang et al. |
| 7,283,119 B2 | 10/2007 | Kishi |
| 7,292,386 B2 | 11/2007 | Kanbe |
| 7,304,987 B1 | 12/2007 | James et al. |
| 7,312,916 B2 | 12/2007 | Pullen et al. |
| 7,342,556 B2 | 3/2008 | Oue et al. |
| 7,345,810 B2 | 3/2008 | Chopra et al. |
| 7,352,353 B2 | 4/2008 | Albert et al. |
| 7,365,732 B2 | 4/2008 | Matsuda et al. |
| 7,382,351 B2 | 6/2008 | Kishi |
| 7,411,719 B2 | 8/2008 | Paolini et al. |
| 7,417,787 B2 | 8/2008 | Chopra et al. |
| 7,420,549 B2 | 9/2008 | Jacobson et al. |
| 7,433,113 B2 | 10/2008 | Chopra et al. |
| 7,439,948 B2 | 10/2008 | Johnson |
| 7,443,570 B2 | 10/2008 | Chopra |
| 7,474,295 B2 | 1/2009 | Matsuda |
| 7,495,821 B2 | 2/2009 | Yamakita et al. |
| 7,502,162 B2 | 3/2009 | Lin et al. |
| 7,545,557 B2 | 6/2009 | Iftime et al. |
| 7,548,291 B2 | 6/2009 | Lee et al. |
| 7,557,981 B2 | 7/2009 | Liang et al. |
| 7,605,972 B2 | 10/2009 | Kawai et al. |
| 7,609,435 B2 | 10/2009 | Moriyama et al. |
| 7,626,185 B2 | 12/2009 | Krak et al. |
| 7,636,076 B2 | 12/2009 | Hung et al. |
| 7,652,656 B2 | 1/2010 | Chopra et al. |
| 7,656,576 B2 | 2/2010 | Suwabe et al. |
| 7,679,599 B2 | 3/2010 | Kawai |
| 7,679,814 B2 | 3/2010 | Paolini, Jr. et al. |
| 7,686,463 B2 | 3/2010 | Goto |
| 7,760,419 B2 | 7/2010 | Lee |
| 7,782,292 B2 | 8/2010 | Miyasaka et al. |
| 7,808,696 B2 | 10/2010 | Lee et al. |
| 7,830,592 B1 | 11/2010 | Sprague et al. |
| 7,848,009 B2 | 12/2010 | Machida et al. |
| 7,852,547 B2 | 12/2010 | Kim |
| 7,852,548 B2 | 12/2010 | Roh |
| 7,911,681 B2 | 3/2011 | Ikegami et al. |
| 7,933,062 B2 | 4/2011 | Masuzawa et al. |
| 7,982,941 B2 | 7/2011 | Lin et al. |
| 8,040,594 B2 | 10/2011 | Paolini et al. |
| 8,067,305 B2 | 11/2011 | Zafiropoulo et al. |
| 8,068,090 B2 | 11/2011 | Machida et al. |
| 8,072,675 B2 | 12/2011 | Lin et al. |
| 8,081,375 B2 | 12/2011 | Komatsu et al. |
| 8,089,686 B2 | 1/2012 | Addington et al. |
| 8,115,729 B2 | 2/2012 | Danner et al. |
| 8,120,838 B2 | 2/2012 | Lin et al. |
| 8,159,636 B2 | 4/2012 | Sun et al. |
| 8,164,823 B2 | 4/2012 | Ikegami et al. |
| 8,169,690 B2 | 5/2012 | Lin et al. |
| 8,174,491 B2 | 5/2012 | Machida et al. |
| 8,174,492 B2 | 5/2012 | Kim et al. |
| 8,237,892 B1 | 8/2012 | Sprague et al. |
| 8,243,013 B1 | 8/2012 | Sprague et al. |
| 8,355,196 B2 | 1/2013 | Yan et al. |
| 8,395,836 B2 | 3/2013 | Lin et al. |
| 8,422,116 B2 | 4/2013 | Sprague et al. |
| 8,441,713 B2 | 5/2013 | Kawashima et al. |
| 8,462,423 B2 | 6/2013 | Farrand et al. |
| 8,466,852 B2 | 6/2013 | Drzaic et al. |
| 8,477,405 B2 | 7/2013 | Ishii et al. |
| 8,491,767 B2 | 7/2013 | Gibson et al. |
| 8,503,063 B2 | 8/2013 | Sprague |
| 8,520,296 B2 | 8/2013 | Wang et al. |
| 8,537,104 B2 | 9/2013 | Markvoort et al. |
| 8,565,522 B2 | 10/2013 | Swic |
| 8,570,272 B2 | 10/2013 | Hsieh et al. |
| 8,570,639 B2 | 10/2013 | Masuzawa et al. |
| 8,574,937 B2 | 11/2013 | Shi |
| 8,605,354 B2 | 12/2013 | Zhang et al. |
| 8,610,998 B2 | 12/2013 | Baisch et al. |
| 8,629,832 B2 | 1/2014 | Tanabe |
| 8,649,084 B2 | 2/2014 | Wang et al. |
| 8,670,174 B2 | 3/2014 | Sprague et al. |
| 8,681,191 B2 | 3/2014 | Yang et al. |
| 8,687,265 B2 | 4/2014 | Ahn et al. |
| 8,704,754 B2 | 4/2014 | Machida et al. |
| 8,704,756 B2 | 4/2014 | Lin |
| 8,717,662 B2 | 5/2014 | Komatsu |
| 8,717,664 B2 | 5/2014 | Wang et al. |
| 8,786,935 B2 | 7/2014 | Sprague |
| 8,797,258 B2 | 8/2014 | Sprague |
| 8,797,636 B2 | 8/2014 | Yang et al. |
| 8,797,637 B2 | 8/2014 | Fujishiro et al. |
| 8,810,899 B2 | 8/2014 | Sprague et al. |
| 8,902,491 B2 | 12/2014 | Wang et al. |
| 8,964,282 B2 | 2/2015 | Wang et al. |
| 8,988,764 B2 | 3/2015 | Abe et al. |
| 9,052,564 B2 | 6/2015 | Sprague et al. |
| 9,129,566 B2 | 9/2015 | Shigehiro |
| 9,341,915 B2 | 5/2016 | Yang |
| 2001/0035926 A1 | 11/2001 | Yamaguchi et al. |
| 2004/0085619 A1 | 5/2004 | Wu et al. |
| 2007/0002008 A1 | 1/2007 | Tam |
| 2007/0080928 A1 | 4/2007 | Ishii et al. |
| 2007/0273637 A1 | 11/2007 | Zhou et al. |
| 2008/0042928 A1 | 2/2008 | Schlangen et al. |
| 2008/0062159 A1 | 3/2008 | Roh et al. |
| 2008/0117165 A1 | 5/2008 | Machida et al. |
| 2008/0174531 A1 | 7/2008 | Ash |
| 2008/0237550 A1 | 10/2008 | Yang et al. |
| 2009/0153942 A1 | 6/2009 | Daniel et al. |
| 2009/0184897 A1 | 7/2009 | Miyamoto |
| 2009/0311484 A1 | 12/2009 | Mclellan et al. |
| 2010/0103502 A1 | 4/2010 | Jacobson et al. |
| 2010/0283804 A1 | 11/2010 | Sprague et al. |
| 2011/0043543 A1 | 2/2011 | Chen et al. |
| 2011/0175939 A1 | 7/2011 | Moriyama et al. |
| 2011/0199671 A1 | 8/2011 | Amundson et al. |
| 2011/0234557 A1 | 9/2011 | Yang et al. |
| 2011/0261433 A1 | 10/2011 | Sprague et al. |
| 2012/0194899 A1 | 8/2012 | Zhang |
| 2012/0200610 A1* | 8/2012 | Sakamoto ............ G09G 3/344 345/690 |
| 2012/0229885 A1 | 9/2012 | Chen et al. |
| 2012/0299947 A1 | 11/2012 | Tsuda et al. |
| 2013/0208338 A1 | 8/2013 | Wang et al. |
| 2013/0278995 A1 | 10/2013 | Drzaic et al. |
| 2013/0300727 A1 | 11/2013 | Lin et al. |

(56) References Cited

U.S. PATENT DOCUMENTS

| | | | |
|---|---|---|---|
| 2014/0011913 A1 | 1/2014 | Du et al. | |
| 2014/0055840 A1 | 2/2014 | Zang et al. | |
| 2014/0078036 A1 | 3/2014 | Zhang et al. | |
| 2014/0078576 A1 | 3/2014 | Sprague | |
| 2014/0092466 A1 | 4/2014 | Wang et al. | |
| 2014/0104675 A1* | 4/2014 | Morikawa | G02F 1/167 359/296 |
| 2014/0340735 A1 | 11/2014 | Lin et al. | |
| 2014/0347407 A1 | 12/2014 | Wang et al. | |
| 2015/0198858 A1 | 7/2015 | Chan et al. | |
| 2015/0234250 A1 | 8/2015 | Lin et al. | |
| 2016/0139483 A1 | 5/2016 | Wang | |
| 2016/0284277 A1 | 9/2016 | Lin | |

FOREIGN PATENT DOCUMENTS

| | | |
|---|---|---|
| CN | 101075068 | 11/2007 |
| CN | 1617033 A | 5/2008 |
| CN | 101542383 | 9/2009 |
| EP | 1 089 118 | 4/2001 |
| JP | 2000231126 | 8/2000 |
| JP | 2001242309 | 9/2001 |
| JP | 2004020818 | 6/2002 |
| JP | 2006343458 | 12/2006 |
| JP | 2007033710 | 2/2007 |
| JP | 2007322617 A | 12/2007 |
| JP | 2008-033000 | 2/2008 |
| JP | 200803335 | 2/2008 |
| JP | 2008-209589 | 9/2008 |
| JP | 2009116041 | 5/2009 |
| JP | 2009192637 | 8/2009 |
| JP | 2011158783 | 8/2011 |
| KR | 10-2007-0082680 | 8/2007 |
| KR | 10-2008-0023913 | 3/2008 |
| KR | 10-2011-0103765 | 9/2011 |
| KR | 10-2011-0112329 | 10/2011 |
| KR | 10-1232146 | 2/2013 |
| TW | 200935155 | 8/2009 |
| TW | 200951599 | 12/2009 |
| TW | 201122697 | 7/2011 |
| TW | 201237529 | 9/2012 |
| WO | WO_95-19227 | 7/1995 |
| WO | WO_98-41899 A3 | 9/1998 |
| WO | WO_1999-53373 A1 | 10/1999 |
| WO | WO_03-016993 A1 | 2/2003 |
| WO | WO_2003-016993 A1 | 2/2003 |
| WO | WO_2007-013682 | 2/2007 |
| WO | WO_2008-054210 A3 | 5/2008 |
| WO | WO_2009-134889 A1 | 11/2009 |
| WO | WO_2010-089058 A1 | 8/2010 |
| WO | WO_2011-155410 | 12/2011 |

OTHER PUBLICATIONS

U.S. Appl. No. 14/921,265, filed Oct. 23, 2015, Craig Lin et al.
PCT/US2014/058901, Notification of Transmittal of the International Search Report and The Written Opinion of The International Searching Authority, or The Declaration, dated Jan. 8, 2015.
U.S. Appl. No. 61/890,106, filed Oct. 11, 2013, Ming Wang et al.
U.S. Appl. No. 14/242,793, filed Apr. 1, 2014, Wang et al.
U.S. Appl. No. 14/256,768, filed Apr. 18, 2014, Du et al.
U.S. Appl. No. 14/279,210, filed May 15, 2014, Lin.
U.S. Appl. No. 14/309,727, filed Jun. 19, 2014, Sprague.
U.S. Appl. No. 14/535,172, filed Nov. 6, 2014, Ming Wang et al.
Kawaguchi, (2000) Synthesis of Polyethylene macromonomers and their radical copolymerizations with methyl methacrylate in homogeneous and oligoethylene metls media. DesignedMonomersPolymers_2000_3_3pp263.
European Patent Office; EP Appl. No. 14851685.9; "Extended European Search Report"; dated Mar. 8, 2017. Mar. 8, 2017.

\* cited by examiner

COLOR DISPLAY DEVICE

This application claims the benefit of U.S. Provisional Application No. 61/890,106, filed Oct. 11, 2013. The contents of the above-identified application is incorporated herein by reference in its entirety.

FIELD OF THE INVENTION

The present invention is directed to an electrophoretic fluid, in particular, an electrophoretic fluid comprising substantially uncharged neutral buoyancy particles for improving optical performance of an electrophoretic display, and an electrophoretic display utilizing such a fluid.

BACKGROUND OF THE INVENTION

In order to achieve a color display, color filters are often used. The most common approach is to add color filters on top of black/white sub-pixels of a pixellated display to display the red, green and blue colors. When a red color is desired, the green and blue sub-pixels are turned to the black state so that the only color displayed is red. When the black state is desired, all three-sub-pixels are turned to the black state. When the white state is desired, the three sub-pixels are turned to red, green and blue, respectively, and as a result, a white state is seen by the viewer.

The disadvantage of such a technique is that since each of the sub-pixels has a reflectance of about one third (⅓) of the desired white state, the white state is fairly dim. To compensate this, a fourth sub-pixel may be added which can display only the black and white states, so that the white level is doubled at the expense of the red, green or blue color level (where each sub-pixel is only one fourth of the area of the pixel). Brighter colors can be achieved by adding light from the white pixel, but this is achieved at the expense of color gamut to cause the colors to be very light and unsaturated. A similar result can also be achieved by reducing the color saturation of the three sub-pixels. Even with these approaches, the white level is normally substantially less than half of that of a black and white display, rendering it an unacceptable choice for display devices, such as e-readers or displays that need well readable black-white brightness and contrast.

SUMMARY OF THE INVENTION

One aspect of the present invention is directed to a display layer comprising an electrophoretic fluid sandwiched between a common electrode and a layer of pixel electrodes and having first and second surfaces on opposed sides thereof, the electrophoretic fluid comprising a first type of particles, a second type of particles, a third type of particles and a fourth type of particles which is substantially uncharged neutral buoyancy particles, all dispersed in a solvent or solvent mixture, the first, second and third types of particles having respectively first, second and third optical characteristics differing from one another, the first type of particles having a charge of one polarity and the second and third types of particles having charges of the opposite polarity, and the second type of particles having an electric field threshold, such that:

(a) application of an electric field between the common electrode and a pixel electrode, which electric field is greater than the electric field threshold and having the same polarity as the second type of particles causes an area corresponding to the pixel electrode to display the second optical characteristic at the first surface;

(b) application of an electric field between the common electrode and a pixel electrode, which electric field is greater than the electric field threshold and having the same polarity as the first type of particles causes an area corresponding to the pixel electrode to display the first optical characteristic at the first surface; or (c) once the first optical characteristic is displayed at the first surface, application of an electric field between the common electrode and a pixel electrode, which electric field is the same as, or lower than, the electric field threshold and having the same polarity as the third type of particles causes an area corresponding to the pixel electrode to display the third optical characteristic at the first surface.

In one embodiment, the first type of particles and the second type of particles are of the white and black colors, respectively.

In one embodiment, the third type of particles is non-white and non-black.

In one embodiment, the optical characteristic is color state.

In one embodiment, the substantially uncharged neutral buoyancy particles are formed from a material selected from the group consisting of polyacrylate, polymethacrylate, polystyrene, polyaniline, polypyrrole, polyphenol and polysiloxane.

In one embodiment, the substantially uncharged neutral buoyancy particles are formed from a material selected from the group consisting of poly(pentabromophenyl methacrylate), poly(2-vinylnapthalene), poly(naphthyl methacrylate), poly(alphamethylstyrene), poly(N-benzyl methacrylamide) and poly(benzyl methacrylate).

In one embodiment, the substantially uncharged neutral buoyancy particles are core-shell particles.

In one embodiment, the concentration of the substantially uncharged neutral buoyancy particles in an electrophoretic fluid is in a range of 0.1 to 10% by volume.

In one embodiment, the concentration of the substantially uncharged neutral buoyancy particles in an electrophoretic fluid is in a range of 0.1 to 5% by volume.

In one embodiment, the display layer displays the color of the first type of particles, the color of the second type of particles and the color of the third type of particles, but not the color of the fourth type of particles.

Another aspect of the present invention is directed to an electrophoretic fluid which fluid comprises a first type of particles, a second type of particles, a third type of particles and a fourth type of particles, all of which are dispersed in a solvent or solvent mixture, wherein (a) the first type of particles and the second type of particles carry opposite charge polarities;

(b) the third type of particles has the same charge polarity as the first or the second type of particles, but at a lower intensity;

(c) the first or second type of particles which has the same charge polarity as the third type of pigment particles has a threshold voltage; and (d) the fourth type of particles is substantially uncharged neutral buoyancy particles.

DETAILED DESCRIPTION OF THE INVENTION

Aggregation among oppositely charged particles during operation and charged particles sticking to the surface of display cells on the viewing side are two major failure modes for the reliability of an electrophoretic display. So far there has been no effective way to solve this issue without affecting either the mechanical property of the display cell structure or the electro-optical performance of the display device.

This phenomenon is especially pronounced in a fluid system which has multiple types of charged pigment particles. This is because the higher particle concentration in the fluid causes more particle-sticking.

The present inventors now have found that substantially uncharged neutral buoyancy particles may be added in the fluid to eliminate the particle sticking issue without affecting the electro-optical performance of the display device.

The term "substantially uncharged" refers to the particles which are either uncharged or carry a charge which is less than 10% of the average charge carried by the other positively charged pigment particles or negatively charged pigment particles in the same electrophoretic fluid. In one embodiment, the neutral buoyancy particles are uncharged.

The term "neutral buoyancy" refers to particles which do not rise or fall with gravity. In other words, the particles would float in the fluid between the two electrode plates. In one embodiment, the density of the neutral buoyancy particles may be the same as the density of the solvent or solvent mixture in which they are dispersed.

Figure 1:
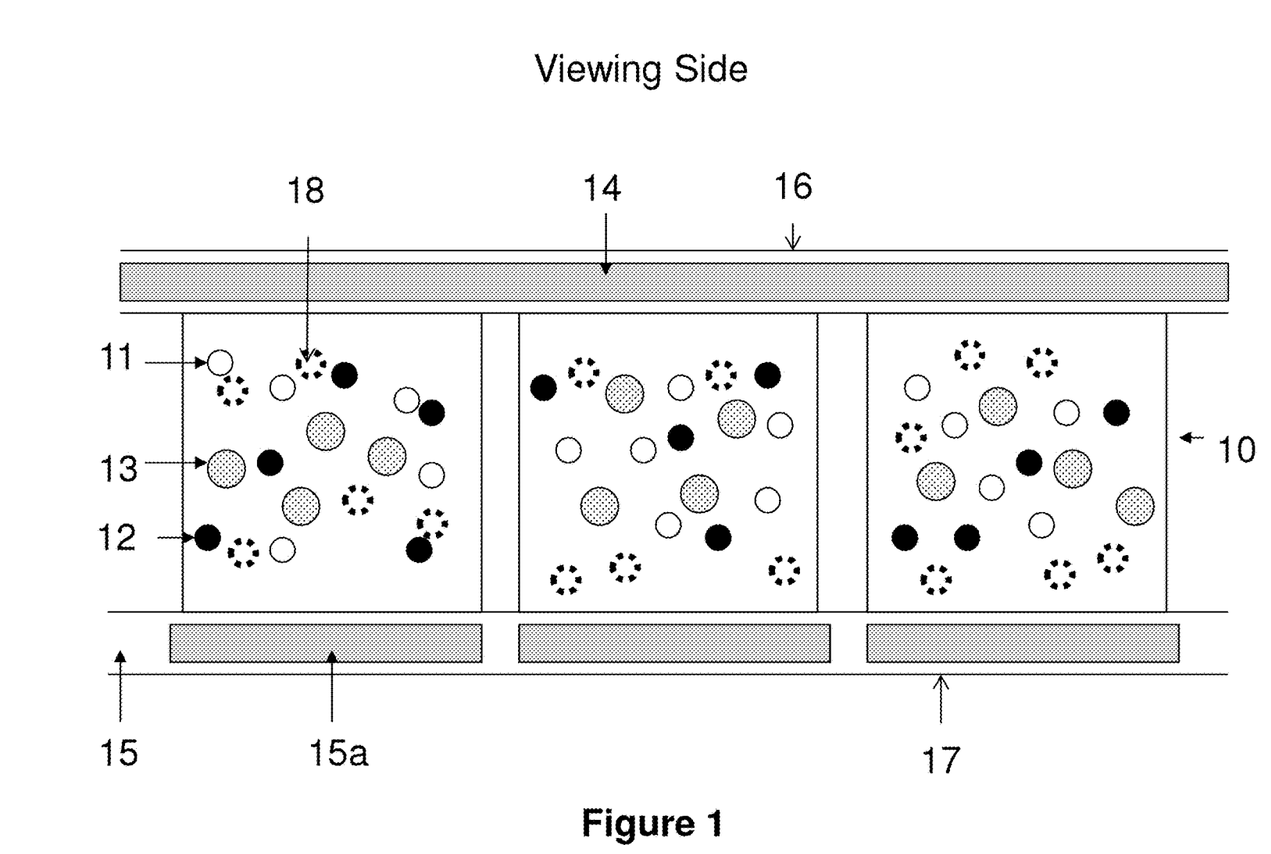
FIG. 1 depicts an electrophoretic fluid comprising three types of charged pigment particles and a fourth type of particles which is substantially uncharged neutral buoyancy particles, all of which are dispersed in a solvent or solvent mixture.

The electrophoretic fluid of present invention comprises three types of charged pigment particles and a fourth type of particles which is substantially uncharged neutral buoyancy particles, all of which are dispersed in a dielectric solvent or solvent mixture. For ease of illustration, the fluid has three types of charged pigment particles, namely the white particles (11), the black particles (12) and the colored particles (13), and the substantially uncharged neutral buoyancy particles (18), as shown in FIG. 1.

However, it is understood that the scope of the invention broadly encompasses particles of any colors as long as the three types of charged particles have visually distinguishable colors.

A display layer utilizing the display fluid of the present invention has two surfaces, a first surface (16) on the viewing side and a second surface (17) on the opposite side of the first surface (16). The display fluid is sandwiched between the two surfaces. On the side of the first surface (16), there is a common electrode (14) which is a transparent electrode layer (e.g., ITO), spreading over the entire top of the display layer. On the side of the second surface (17), there is an electrode layer (15) which comprises a plurality of pixel electrodes (15a). The display fluid is filled in display cells. The display cells may be aligned with or not aligned with the pixel electrodes. An area corresponding to a pixel electrode may be referred to as a pixel or a sub-pixel. The driving of an area corresponding to a pixel electrode is effected by applying a voltage potential difference (or known as an electric field) between the common electrode and the pixel electrode.

The pixel electrodes are described in U.S. Pat. No. 7,046,228, the content of which is incorporated herein by reference in its entirety. It is noted that while active matrix driving with a thin film transistor (TFT) backplane is mentioned for the layer of pixel electrodes, the scope of the present invention encompasses other types of electrode addressing as long as the electrodes serve the desired functions.

For the charged white particles (11), they may be formed from an inorganic pigment, such as $TiO_2$, $ZrO_2$, $ZnO$, $Al_2O_3$, $Sb_2O_3$, $BaSO_4$, $PbSO_4$ or the like.

For the charged black particles (12), they may be formed from CI pigment black 26 or 28 or the like (e.g., manganese ferrite black spinel or copper chromite black spinel) or carbon black.

The third type of charged pigment particles (13) is usually non-black and non-white and it may be of a color such as red, green, blue, magenta, cyan or yellow. The pigments for this type of particles may include, but are not limited to, CI pigment PR 254, PR122, PR149, PG36, PG58, PG7, PB28, PB15:3, PY138, PY150, PY155 or PY20. Those are commonly used organic pigments described in color index handbook "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

In addition to the colors, the first, second and third types of charged particles may have other distinct optical characteristics, such as optical transmission, reflectance, luminescence or, in the case of displays intended for machine reading, pseudo-color in the sense of a change in reflectance of electromagnetic wavelengths outside the visible range.

The charged pigment particles may also be particles coated with a polymer layer on their surface and the polymer coating can be prepared through various conventionally known polymerization techniques.

The charged pigment particles may carry a natural charge or are charged through the presence of a charge controlling agent.

The percentages of the three types of charged particles in the fluid may vary. For example, the black particle may take up about 0.1% to 10%, preferably 0.5% to 5% by volume of the electrophoretic fluid; the white particle may take up about 1% to 50%, preferably 5% to 15% by volume of the fluid; and the colored particle may take up about 2% to 20%, preferably 4% to 10% by volume of the fluid.

The concentration of the substantially uncharged neutral buoyancy particles (18) in an electrophoretic fluid is preferably in the range of about 0.1 to about 10% by volume, more preferably in the range of about 0.1 to about 5% by volume.

The term "about" refers to a range which is ±5% of the indicated value.

The substantially uncharged neutral buoyancy particles (18) may be formed from a polymeric material. The polymeric material may be a copolymer or a homopolymer.

Examples of the polymeric material for the substantially uncharged neutral buoyancy particles may include, but are not limited to, polyacrylate, polymethacrylate, polystyrene, polyaniline, polypyrrole, polyphenol, polysiloxane or the like. More specific examples of the polymeric material may include, but are not limited to, poly(pentabromophenyl methacrylate), poly(2-vinylnapthalene), poly(naphthyl methacrylate), poly(alpha-methylstyrene), poly(N-benzyl methacrylamide) or poly(benzyl methacrylate).

More preferably, the substantially uncharged neutral buoyancy particles are formed from a polymer which is not soluble in the dielectric solvent of the display fluid, and also has a high refractive index. In one embodiment, the refractive index of the substantially uncharged neutral buoyancy particles is different from that of the solvent or solvent mixture in which the particles are dispersed. However, typically the refractive index of the substantially uncharged neutral buoyancy particles is higher than that of the solvent or solvent mixture. In some cases, the refractive index of the substantially uncharged neutral buoyancy particles may be above 1.45.

In one embodiment, the materials for the substantially uncharged neutral buoyancy particles may comprise an aromatic moiety.

The substantially uncharged neutral buoyancy particles may be prepared from monomers through polymerization techniques, such as suspension polymerization, dispersion polymerization, seed polymerization, soap-free polymerization, emulsion polymerization or physical method, including inverse emulsification-evaporation process. The monomers are polymerized in the presence of a dispersant. The presence of the dispersant allows the polymer particles to be formed in a desired size range and the dispersant may also form a layer physically or chemically bonded to the surface of the polymer particles to prevent the particles from agglomeration.

The dispersants preferably has a long chain (of at least eight atoms), which may stabilize the polymer particles in a hydrocarbon solvent. Such dispersants may be an acrylate-terminated or vinyl-terminated macromolecule, which are suitable because the acrylate or vinyl group can co-polymerize with the monomer in the reaction medium.

One specific example of the dispersant is acrylate terminated polysiloxane (Gelest, MCR-M17, MCR-M22), Another type of suitable dispersants is polyethylene macromonomers, as shown below:

The backbone of the macromonomer may be a polyethylene chain and n may be 30-200. The synthesis of this type of macromonomers may be found in Seigou Kawaguchi et al, Designed Monomers and Polymers, 2000, 3, 263.

If the fluid system is fluorinated, the dispersants are then preferably also fluorinated.

Alternatively, the substantially uncharged neutral buoyancy particles may also be formed from a core particle coated with a polymeric shell and the shell may be formed, for example, from any of the polymeric material identified above.

The core particle may be of an inorganic pigment such as $TiO_2$, $ZrO_2$, ZnO, $Al_2O_3$, CI pigment black 26 or 28 or the like (e.g., manganese ferrite black spinel or copper chromite black spinel), or an organic pigment such as phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher, or the like.

In the case of core-shell substantially uncharged neutral buoyancy particles, they may be formed by a microencapsulation method, such as coacervation, interfacial polycondensation, interfacial cross-linking, in-suit polymerization or matrix polymerization.

The size of the substantially uncharged neutral buoyancy particles is preferably in the range of about 100 nanometers to about 5 microns.

There may be other particulate matters in the fluid which are included as additives to enhance performance of the display device, such as switching speed, imaging bistability and reliability.

The solvent in which the three types of pigment particles are dispersed is clear and colorless. It preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-corning (DC-200).

Two of the three types of charged pigment particles carry opposite charge polarities and the third type of charged pigment particles is slightly charged. The term "slightly charged" is intended to refer to the charge level of the particles less than about 50%, preferably about 5% to about 30%, of the charge intensity of the stronger charged particles. In one embodiment, the charge intensity may be measured in terms of zeta potential. In one embodiment, the zeta potential is determined by Colloidal Dynamics AcoustoSizer IIM with a CSPU-100 signal processing unit, ESA EN# Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to between 5-10% by weight. The sample also contains a charge control agent (Solsperse 17000®, available from Lubrizol Corporation, a Berkshire Hathaway company; "Solsperse" is a Registered Trade Mark), with a weight ratio of 1:10 of the charge control agent to the particles. The mass of the diluted sample is determined and the sample is then loaded into the flow through cell for determination of the zeta potential.

If the black particles are positively charged and the white particles are negatively charged, then the colored pigment particles may be slightly charged. In other words, in this example, the charges carried by the black and the white particles are much more intense than the charge carried by the colored particles.

In addition, the third type of charged particles which carries a slight charge has a charge polarity which is the same as the charge polarity carried by either one of the other two types of the stronger charged particles.

The three types of charged particles may have varying sizes. In one embodiment, one of the three types of particles is larger than the other two types. It is noted that among the three types of particles, the one type of particles which is slightly charged preferably has the larger size. For example, both the black and the white particles are relatively small and their sizes (tested through dynamic light scattering) may range from about 50 nm to about 800 nm and more preferably from about 200 nm to about 700 nm, and in this example, the colored particles which are slightly charged, preferably are about 2 to about 50 times and more preferably about 2 to about 10 times larger than the black particles and the white particles.

The term "threshold voltage" or "electric field threshold", in the context of the present invention, is defined as the maximum electric field that may be applied for a period of time (typically not longer than 30 seconds, preferably not longer than 15 seconds), to a group of particles, without causing the particles to appear at the viewing side of a pixel, when the pixel is driven from a color state different from the color state of the group of particles. The term "viewing side", in the present application, refers to the first surface in a display layer where images are seen by the viewers.

The threshold voltage or electric field threshold is either an inherent characteristic of the charged particles or an additive-induced property.

In the former case, the threshold voltage or electric field threshold is generated, relying on certain attraction force between oppositely charged particles or between particles and certain substrate surfaces.

In the case of additive-induced threshold voltage or electric field threshold, a threshold agent which induces or enhances the threshold characteristics of an electrophoretic fluid may be added. The threshold agent may be any material which is soluble or dispersible in the solvent or solvent mixture of the electrophoretic fluid and carries or induces a charge opposite to that of the charged particles. The threshold agent may be sensitive or insensitive to the change of applied voltage. The term "threshold agent" may broadly include dyes or pigments, electrolytes or polyelectrolytes, polymers, oligomers, surfactants, charge controlling agents and the like.

Additional information relating to the threshold agent may be found in U.S. Pat. No. 8,115,729, the content of which is incorporated herein by reference in its entirety.

The following is an example illustrating the present invention.

Example

Figure 2:
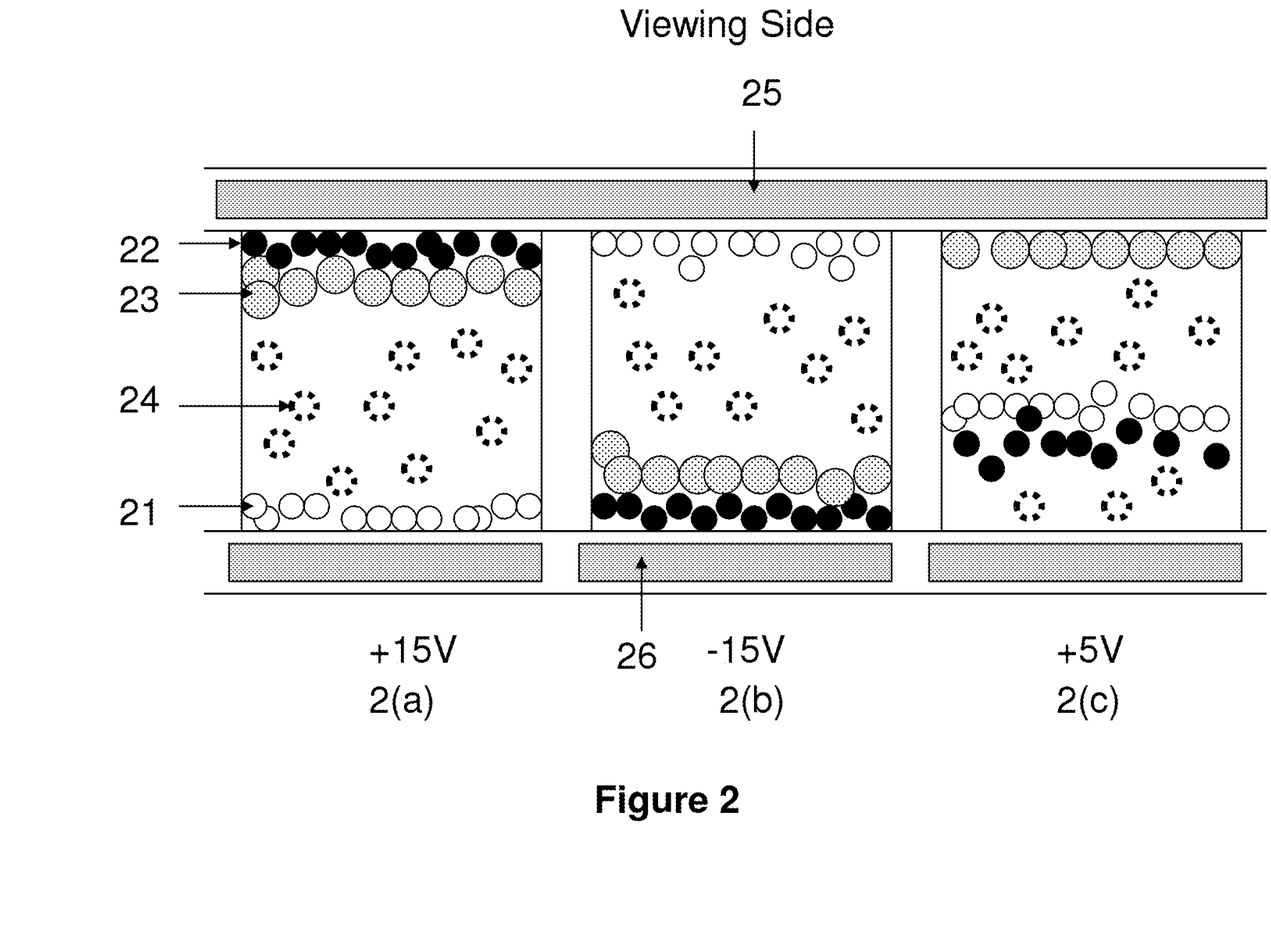
FIG. 2 depicts one example of the present invention.

This example is demonstrated in FIG. 2. The black particles (22) are assumed to have a threshold voltage of 5V. Therefore, the black particles (22) would not move to the viewing side if an applied voltage potential difference is 5V or lower.

The white pigment particles (21) are negatively charged while the black pigment particles (22) are positively charged, and both types of the pigment particles are smaller than the colored particles (23).

The colored particles (23) carry the same charge polarity as the black particles which have the threshold voltage, but are slightly charged. As a result, the black particles move faster than the colored particles (23), when an applied voltage potential is higher than the threshold voltage of the black particles because of the stronger charge intensity they carry.

The fourth type of particles is the substantially uncharged neutral buoyancy particles (24).

In FIG. 2a, the applied voltage potential difference is +15V. In this case, the white particles (21) move to be near or at the pixel electrode (26) and the black particles (22) and the colored particles (23) move to be near or at the common electrode (25). As a result, the black color is seen at the viewing side. The colored particles (23) move towards the common electrode (25); however because their lower charge intensity and larger size, they move slower than the black particles.

In FIG. 2b, when a voltage potential difference of −15V is applied, the white particles (21) move to be near or at the common electrode (25) and the black particles and the colored particles move to be near or at the pixel electrode (26). As a result, the white color is seen at the viewing side.

The colored particles (23) move towards the pixel electrode because they are also positively charged. However, because of their lower charge intensity and larger size, they move slower than the black particles.

In FIG. 2c, a voltage potential difference of +5V is applied to the fluid in FIG. 2(b). In this case, the negatively charged white particles (21) move towards the pixel electrode (26). The black particles (22) move little because of their threshold voltage being 5V. Due to the fact that the colored particles (23) do not have a significant threshold voltage, they move to be near or at the common electrode (25) and as a result, the color of the colored particles is seen at the viewing side.

In one embodiment of this aspect of the present invention, the substantially uncharged neutral buoyancy particles (24) added to the fluid may have a color substantially the same visually to the color of one of the three types of charged pigment particles. For example, in a display fluid, there may be charged black particles, charged white particles, slightly charged colored particles and substantially uncharged neutral buoyancy particles and the substantially uncharged neutral buoyancy particles may be white, black or have the same color as the colored particles.

In another embodiment, the substantially uncharged neutral buoyancy particles may have a color substantially different from the color of either one of the three types of charged pigment particles.

A display device comprises an electrophoretic fluid of the present invention which comprises three types of charged particles and a fourth type of particles which is substantially uncharged neutral buoyancy particles, can display the colors of the three types of charged particles respectively, but not the fourth type of particles.

The presence of the substantially uncharged neutral buoyancy particles in the fluid increases reflection of incident light, especially if the particles are formed from a reflective material. As a result, the contrast ratio can be improved.

The image stability may be improved by the addition of the substantially uncharged neutral buoyancy particles in the three-charged-particle fluid system. The substantially uncharged neutral buoyancy particles can fill in the gaps resulted from the charged pigment particles being over packed on the surface of an electrode under a driving electrical field, thus preventing the charged pigment particles from settling due to the gravitational force.

In addition, if the substantially uncharged neutral buoyancy particles are white, they may enhance the reflectivity of the display. If they are black, they may enhance the black color displayed.

The electrophoretic fluid in an electrophoretic display device is filled in display cells. The display cells may be cup-like microcells as described in U.S. Pat. No. 6,930,818, the content of which is incorporated herein by reference in its entirety. The display cells may also be other types of micro-containers, such as microcapsules, microchannels or equivalents, regardless of their shapes or sizes. All of these are within the scope of the present application.

In one embodiment of the present invention, the display device utilizing the present electrophoretic fluid is a highlight display device and in this embodiment, the colored particles are of the same color in all display cells. Each display cell would be a pixel in such a highlight display device if the display cells are aligned with the pixel electrodes. However, the display cells may be aligned with the pixel electrodes or un-aligned with the pixel electrodes, in a highlight display device.

In another embodiment, the display device utilizing the present electrophoretic fluid may be a multi-color display device. In this embodiment, the colored particles are of different colors in the display cells. In this embodiment, the display cells and the pixel electrodes are aligned.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. A display layer comprising an electrophoretic fluid sandwiched between a common electrode and a layer of pixel electrodes and having first and second surfaces on opposed sides thereof, the electrophoretic fluid comprising a first type of particles, a second type of particles, a third type of particles and a fourth type of particles which is substantially uncharged neutral buoyancy particles, all dispersed in a solvent or solvent mixture, the first, second and third types of particles having respectively first, second and third optical characteristics differing from one another, one of the first and second types of particles being white and the other black and the third type of particles being non-white and non-black, the first type of particles having a charge of one polarity and the second and third types of particles having charges of the opposite polarity from the first type of particles, and the second type of particles having an electric field threshold, such that:
  (a) application of an electric field between the common electrode and a pixel electrode, which electric field is greater than the electric field threshold and has the same polarity as the second type of particles, causes an area corresponding to the pixel electrode to display the second optical characteristic at the first surface;
  (b) application of an electric field between the common electrode and a pixel electrode, which electric field is greater than the electric field threshold and has the same polarity as the first type of particles causes an area corresponding to the pixel electrode to display the first optical characteristic at the first surface; or
  (c) once the first optical characteristic is displayed at the first surface, application of an electric field between the common electrode and a pixel electrode, which electric field is the same as, or lower than, the electric field threshold and having the same polarity as the third type of particles causes an area corresponding to the pixel electrode to display the third optical characteristic at the first surface,
wherein, when the first, second or third optical characteristic is displayed at the first surface, the fourth type of particles remain dispersed in the solvent or solvent mixture, separate from the first, second and third types of particles,
  wherein the concentration of the substantially uncharged neutral buoyancy particles in the electrophoretic fluid is in a range of 0.1 to 10% by volume.

2. The layer of claim 1, wherein the substantially uncharged neutral buoyancy particles are formed from a material selected from the group consisting of polyacrylate, polymethacrylate, polystyrene, polyaniline, polypyrrole, polyphenol and polysiloxane.

3. The layer of claim 1, wherein the substantially uncharged neutral buoyancy particles are formed from a material selected from the group consisting of poly(pentabromophenyl methacrylate), poly(2-vinylnapthalene), poly(naphthyl methacrylate), poly(alpha-methylstyrene), poly(N-benzyl methacrylamide) and poly(benzyl methacrylate).

4. The layer of claim 1, wherein the substantially uncharged neutral buoyancy particles are core-shell particles.

5. The layer of claim 1, wherein the concentration of the substantially uncharged neutral buoyancy particles in the electrophoretic fluid is in a range of 0.1 to 5% by volume.

6. The layer of claim 1, which displays the color of the first type of particles, the color of the second type of particles and the color of the third type of particles, but not the color of the fourth type of particles.

7. An electrophoretic fluid comprising a first type of particles, a second type of particles, a third type of particles and a fourth type of particles, all of which are dispersed in a solvent or solvent mixture, wherein
  (a) the first type of particles and the second type of particles carry opposite charge polarities, one of the first and second types of particles being black and the other white;
  (b) the third type of particles has the same charge polarity as the second type of particles, but at a lower intensity;
  (c) the second type of particles has a threshold voltage; and
  (d) the fourth type of particles is substantially uncharged neutral buoyancy particles which remain dispersed in the solvent or solvent mixture, separate from the first, second and third types of particles,
  wherein the concentration of the substantially uncharged neutral buoyancy particles in the electrophoretic fluid is in a range of 0.1 to 10% by volume.

8. The fluid of claim 7, wherein the substantially uncharged neutral buoyancy particles are formed from a material selected from the group consisting of polyacrylate, polymethacrylate, polystyrene, polyaniline, polypyrrole, polyphenol and polysiloxane.

9. The fluid of claim 7, wherein the substantially uncharged neutral buoyancy particles are formed from a material selected from the group consisting of poly(pentabromophenyl methacrylate), poly(2-vinylnapthalene), poly(naphthyl methacrylate), poly(alpha-methylstyrene), poly(N-benzyl methacrylamide) and poly(benzyl methacrylate).

10. The fluid of claim 7, wherein the substantially uncharged neutral buoyancy particles are core-shell particles.

11. The fluid of claim 7, wherein the concentration of the substantially uncharged neutral buoyancy particles in the electrophoretic fluid is in a range of 0.1 to 5% by volume.

12. A display layer comprising an electrophoretic fluid having first and second surfaces on opposed sides thereof, the electrophoretic fluid comprising a first type of particles, a second type of particles, a third type of particles and a fourth type of particles which is substantially uncharged neutral buoyancy particles, all dispersed in a solvent or solvent mixture, the first, second and third types of particles having respectively first, second and third optical characteristics differing from one another, the first type of particles having a charge of one polarity and the second and third types of particles having charges of the opposite polarity from the first type of particles, and the second type of particles having an electric field threshold, such that:

(a) application of an electric field across the electrophoretic fluid, which electric field is greater than the electric field threshold and has a polarity driving the second type of particles towards the first surface, causes the second optical characteristic to be displayed at the first surface;

(b) application of an electric field across the electrophoretic fluid, which electric field is greater than the electric field threshold and has a polarity driving the first type of particles towards the first surface, causes the first optical characteristic to be displayed at the first surface; or (c) once the first optical characteristic is displayed at the first surface, application of an electric field across the electrophoretic fluid, which electric field is the same as, or lower than, the electric field threshold and has a polarity driving the third type of particles towards the first surface, causes the third optical characteristic to be displayed at the first surface, wherein, when the first, second or third optical characteristic is displayed at the first surface, the fourth type of particles remain dispersed in the solvent or solvent mixture, separate from the first, second and third types of particles, wherein the concentration of the substantially uncharged neutral buoyancy particles in the electrophoretic fluid is in a range of 0.1 to 10% by volume.

13. An electrophoretic fluid comprising a first type of particles, a second type of particles, a third type of particles and a fourth type of particles, all of which are dispersed in a solvent or solvent mixture, the first, second and third types of particles having respectively first, second and third optical characteristics differing from one another, wherein (a) the first type of particles and the second type of particles carry opposite charge polarities;

(b) the third type of particles has the same charge polarity as the second type of particles, but at a lower intensity;

(c) the second type of particles has a threshold voltage; and (d) the fourth type of particles is substantially uncharged neutral buoyancy particles which remain dispersed in the solvent or solvent mixture, separate from the first, second and third types of particles, wherein the concentration of the substantially uncharged neutral buoyancy particles in the electrophoretic fluid is in a range of 0.1 to 10% by volume.

* * * * *